July 15, 1947.　　　　　F. HUMER　　　　　2,423,937
DECK LID HANDLE AND LOCK
Filed Jan. 22, 1945
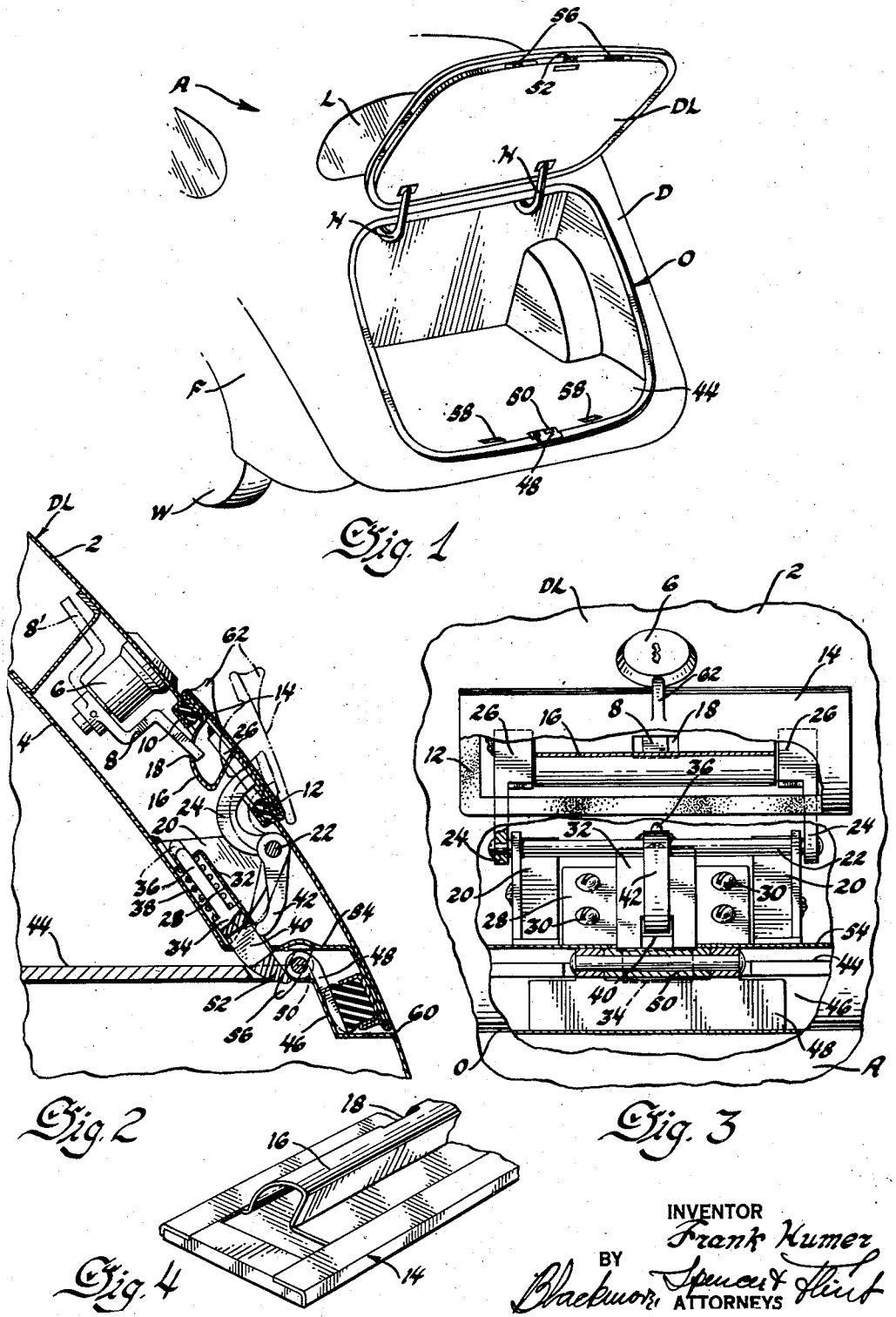
INVENTOR
Frank Humer
BY
Blackmore Spencer & Flint
ATTORNEYS Patented July 15, 1947

2,423,937

UNITED STATES PATENT OFFICE 2,423,937

DECK LID HANDLE AND LOCK

Frank Humer, Detroit, Mich., assignor to General Motors Corporation, Detroit, Mich., a corporation of Delaware Application January 22, 1945, Serial No. 574,019

1 Claim. (Cl. 292—173)

1

This invention relates to deck lid locks and latch mechanism and has particular reference to a type of lock and latch mechanism in which the handle is flush with the deck lid and has no projecting grip or other part.

A usual type of key operated lock is applied and locks the handle in the flush position. When the lock is unlocked the handle may be pulled outwardly to operate a latch which releases the deck lid. The deck lid may then be raised by lifting on the handle.

On the drawing:

Figure 1 is a perspective view of the rear end of an automobile showing the deck lid open.

Figure 2 is a sectional view through the center of the lid, the handle and the latching mechanism, the handle being shown in dotted outline in partially open position.

Figure 3 is a rear view of the handle and latching mechanism, parts being broken away better to illustrate the construction.

Figure 4 is a detailed perspective view of the handle looking from the rear thereof.

Referring to the drawing the rear part of an automobile is indicated at A. The automobile has the rear wheels W, the rear fenders F, the back window light L, the deck D, and the deck lid DL which is mounted on the automobile body by the hinges H. The lid closes the opening O to the deck D.

The deck lid or door DL has the outer panel 2 and the inner panel 4. Between the two panels at the lower edge of the lid the mechanism of the invention is positioned. The lid is provided with an opening in which a conventional type of key operated lock barrel 6 is mounted in any suitable way. The lock barrel operates a latch 8 which is shown in the locked position at 8 and the unlocked position at 8'.

A flange 10 on the deck lid has a rubber seal 12 mounted thereon and a handle 14 is flush with the surface of the lid and is positioned over the opening defined by the flange 10 and in its closed position rests against the rubber 12. The inner part of the handle has a projecting gripping portion 16 secured thereto. This gripping portion has an opening 18 at its upper part and in this opening the latch 8 is adapted to engage when the handle 14 is locked by the lock 6.

The inner panel 4 of the lid has the brackets 20 secured thereto and at the point of these brackets there is rotatably mounted the hinge pin 22. The hinge pin 22 has rigidly mounted thereon the hinges 24 each of which has a part 26 which is rigidly secured to the back of the handle 14.

2

Between the brackets 20 there is secured a second bracket 28. This bracket is secured by means of the screws 30 to the inner deck lid panel 4. The bracket 28 has a box-shaped formation 32 at its center and in this box there is mounted for reciprocating movement a plunger or latch bolt 34. The plunger has an extension 36 which projects through the top of the box 32 and a compression coil spring 38 surrounds the pin and is confined between the top of the box and the top of the plunger.

The plunger has a slot 40 therein in which there is adapted to be received the end of the lever 42 rigidly mounted on the hinge pin 22.

The bottom of the rear compartment of the car is indicated at 44 and the lower rearmost part of the body is indicated at 46. A bracket 48 is secured to the body and a roller 50 is rotatably mounted on a pin mounted in the bracket. In the closed position of the lid the tip 52 of the plunger 34 engages with the roller 50 to hold the deck lid in latched position.

The lower edge 54 of the deck lid is provided with two spaced projecting fingers 56 which engage in openings 58 in the floor 44. The purpose of this construction is to prevent the lid from being pried open after it is locked by inserting a bar at the edge indicated at 60.

The operation of the device is as follows:

With the latch in the locked position as indicated by 8 the small handle 14 can be unlocked by operating the barrel 6 by the usual key. The operator can then seize the small decorative projection 62 and pull the handle 14 outwardly. The projection 62 is not necessary and can be omitted. There is a given amount of lost motion before the tip of the lever 42 engages the end of the slot 40. This lost motion enables the handle to be opened sufficiently to enable the operator to place his hand on the grip 16. A further outward pull on the handle will cause the lever 42 to raise the plunger 34 against the tension of the spring 38 and remove the plunger end 52 from the roller 50. The deck lid may then be raised.

The plunger end 52 is rounded to enable the roller 50 to push the plunger away when the lid is moved from open to closed position.

I claim:

In a lock and latch mechanism for the deck lid of an automotive vehicle, said lid having an opening, a sealing means around said opening, a handle hinged within the lid at one side of said opening and adapted to move bodily over and away from the opening, said handle in its closed position being substantially flush with the outer surface of the lid in contact with said sealing means, a latch bolt mounted in the lid and adapted to engage in an opening in the deck to hold the lid in latched position, and a lever secured to the handle and operated by the movement of the handle and engageable with the latch bolt to cause the release of the bolt to enable the lid to be raised.

FRANK HUMER.

REFERENCES CITED

The following references are of record in the file of this patent:

UNITED STATES PATENTS

| Number | Name | Date |
|---|---|---|
| 1,995,338 | Andrews | Mar. 26, 1935 |
| 2,195,195 | Wartain | Mar. 26, 1940 |
| 2,091,816 | Hynes | Aug. 31, 1937 |
| 201,572 | Taylor | Mar. 19, 1878 |
| 1,558,980 | Halinka | Oct. 27, 1925 |
| 1,616,609 | Davis | Feb. 8, 1927 |
| 2,075,948 | Kuszmaul | Apr. 6, 1937 |
| 2,191,625 | Rightmyer | Feb. 27, 1940 |
| 2,304,144 | Borchers | Dec. 8, 1942 |